United States Patent [19]

Smith

[11] Patent Number: 5,784,792

[45] Date of Patent: Jul. 28, 1998

[54] HAND-HELD LASER LEVEL GRADE CHECKING DEVICE

[76] Inventor: James A. Smith, 2964 Northhill, Selma, Calif. 93662

[21] Appl. No.: 645,120

[22] Filed: May 13, 1996

[51] Int. Cl.$^6$ ............................................. G01C 5/24
[52] U.S. Cl. ............................. 33/227; 33/286; 33/275 R; 33/DIG. 21
[58] Field of Search ................... 33/227, 286, DIG. 21, 33/290, 291, 293–295, 275 R, 233, 234, 241, 292, 348; 356/138, 139, 250, 153, 399, 400; 42/100, 101, 103

[56] References Cited

U.S. PATENT DOCUMENTS

| | | | |
|---|---|---|---|
| 2,308,635 | 1/1943 | Walker | 33/241 |
| 3,088,451 | 5/1963 | Crosby et al. | 33/233 |
| 3,857,639 | 12/1974 | Mason | 356/400 |
| 3,867,764 | 2/1975 | Dunmire et al. | 33/DIG. 21 |
| 3,897,637 | 8/1975 | Genho . | |
| 4,048,489 | 9/1977 | Giannetti | 42/103 |
| 4,333,242 | 6/1982 | Genho . | |
| 4,852,265 | 8/1989 | Rando . | |
| 4,904,081 | 2/1990 | Miyahara . | |
| 4,912,851 | 4/1990 | Rando . | |
| 4,939,863 | 7/1990 | Alexander et al. | 33/DIG. 21 |
| 4,988,193 | 1/1991 | Cain . | |
| 5,108,177 | 4/1992 | Middleton | 33/291 |
| 5,144,487 | 9/1992 | Hersey . | |
| 5,243,398 | 9/1993 | Nielsen . | |
| 5,272,814 | 12/1993 | Key . | |
| 5,400,514 | 3/1995 | Imbrie et al. | 33/290 |
| 5,454,168 | 10/1995 | Langner | 356/153 |
| 5,568,265 | 10/1996 | Matthews | 33/286 |
| 5,604,987 | 2/1997 | Cupp | 33/275 R |

FOREIGN PATENT DOCUMENTS

| | | | |
|---|---|---|---|
| 556379 | 10/1943 | United Kingdom | 33/292 |

*Primary Examiner*—Thomas B. Will
*Assistant Examiner*—Andrew Hirshfeld
*Attorney, Agent, or Firm*—Mark D. Miller

[57] ABSTRACT

A tool for use in checking the level or grade of the ground surface in a construction area or site using a daylight visible wavelength semiconductor laser diode module to project a laser beam from the location of interest to a location where the elevation or the amount of cut or fill is known. The tool is a relatively small, hand-held and compact device that utilizes batteries contained within the tool to power the laser diode. The laser diode module fits within a module plug that fits within a module plug compartment in the front of the tool. A front end cap encloses the laser diode module and the module plug in the tool. The laser beam emitted from the tool is in axial alignment with an edge or ridge on outside surface of the tool. A bubble level ensures that the tool is held parallel to the ground during use.

17 Claims, 3 Drawing Sheets

HAND-HELD LASER LEVEL GRADE CHECKING DEVICE

BACKGROUND OF THE INVENTION

The field of the present invention relates generally to hand tools and, more particularly, to devices for use in grade leveling operations, such as for use in building or construction site layout. Specifically, the invention described herein relates to hand-held level checking devices utilizing lasers to check the grade or level of the ground surface at various points in a construction site in order to ensure the site is the proper grade throughout.

Conventional hand-held sight levels (i.e., the non-laser variety which have been utilized by the construction industry for many years) are similar in appearance and operation to a single focus telescope. The sight level operator, typically referred to in the construction industry as a "gradechecker," holds the sight level adjacent to an engineer's sticktape or other measuring device that rests on the ground near the gradechecker's feet. By kneeling or bending over, the gradechecker looks through the sighting lens in the conventional sight level at a guard lath, typically a small piece of wood that was previously marked for the necessary amount of cut or fill, located adjacent to a survey stake in the construction work area. Using the sight level, the gradechecker checks the level of the grade where he or she is standing.

There have been a variety of survey tools for use in the construction industry which have employed lasers. For example U.S. Pat. Nos. 3,897,637 by Genho, 4,333,242 by Genho Sr., 4,852,265 by Rando et al., 4,904,081 by Miyahara, and 4,912,851 also by Rando et al. all illustrate various apparatuses utilizing laser technology for the construction industry. These and other similar devices utilize lasers to assist in leveling (as in ensuring construction members or floors are level), aligning, plumbing or surveying operations.

None of the devices currently available disclose any apparatus suitable for accomplishing the objectives of the present invention. For instance, laser surveying equipment, as opposed to grade level checking equipment, is used to initially determine the elevations and the cuts and fills necessary to obtain a level site elevation. By necessity, such laser surveying equipment is generally very expensive and difficult to move in comparison to the typical sight level or the level checking device of the present invention. In addition, laser surveying typically incorporates a totally different type of laser than set forth in the present invention (i.e., a gas laser as opposed to semiconductor laser), lasers that require a much greater source of power than that utilized by the laser grade level checking device of the present invention.

SUMMARY OF THE INVENTION

The problems associated with conventional sight levels and presently available construction survey equipment outlined above are solved by the laser grade checking device in accordance with the present invention. That is to say, the present invention provides for a laser grade checking device that is easy to operate, relatively inexpensive to manufacture and durable enough to withstand the rigors of the construction environment.

The laser leveling device of the present invention can be constructed of a strong yet inexpensive and light weight material such as high impact vinyl chloride polymer plastic or carbon fiber-reinforced plastic, or the like, although any number of other materials may also be found to be suitable. The laser leveling device comprises an elongated, generally tubular shaped housing having a forward end and a rearward end. The forward end has a compartment suitable for receiving a modular plug. A daylight visible wavelength semiconductor diode laser module fits tightly within the modular plug. The modular plug, with the laser diode module, is received by the forward end compartment such that the laser diode will, when activated, emit a beam of visible light out the forward end of the housing. A front end cap, having a lens to permit the laser beam to pass, attaches to the forward end of the housing to enclose and contain the modular plug and laser diode module combination.

One or more battery cells, preferably located in a battery compartment at or near the rearward end of the housing, powers the laser diode. The battery cell can be rechargeable to permit its reuse and a recharge port can be provided to allow the battery cell to be recharged while in the housing. The outside surface of the housing has a centered ridge or other mechanism that is in axial alignment with the beam of light from the laser to allow the gradechecker to align the light beam with a mark on an external measuring device.

In use, the gradechecker holds the laser grade checking device along side an engineer's sticktape or other measuring equipment that rests on the ground near the gradechecker's feet. The gradechecker aims the device at the previously marked guard lath. Using the laser checking device, the gradechecker can check the level of the grade where he or she is standing by moving the device up or down the measuring equipment without having to kneel down or bend over, as is required for the conventional sight level. In addition to being easier and faster to use, the laser checking device is more accurate and less sensitive to normal "abuse" than sight levels. Accordingly, the primary objective of the present invention is to provide a durable, lightweight and inexpensive, yet effective, device for checking grade levels.

It is also an important objective of the present invention to provide an elongated housing containing a semiconductor laser diode powered by one or more battery cells located within the housing to emit a daylight visible laser beam for use is checking grade levels.

Another important objective of the present invention is to provide an elongated, generally tubular shaped housing having a modular plug receiving receptacle or compartment in the forward end and a battery compartment in the rearward end of the housing, a modular plug containing a daylight visible wavelength semiconductor laser diode powered by one or more battery cells located in the battery compartment and a centered ridge on the external surface of the housing that is in axial alignment with the beam of light emitted from the laser diode.

It is also an objective of the present invention to provide an elongated housing that receives a self-contained daylight visible laser diode module which emits a beam of light in axial alignment with a ridge or mark on the external surface of the housing.

It is also an object of the present invention to provide an elongated housing in axial alignment with a beam of light emitted from a laser diode located in the housing.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENTS

Figure 1:
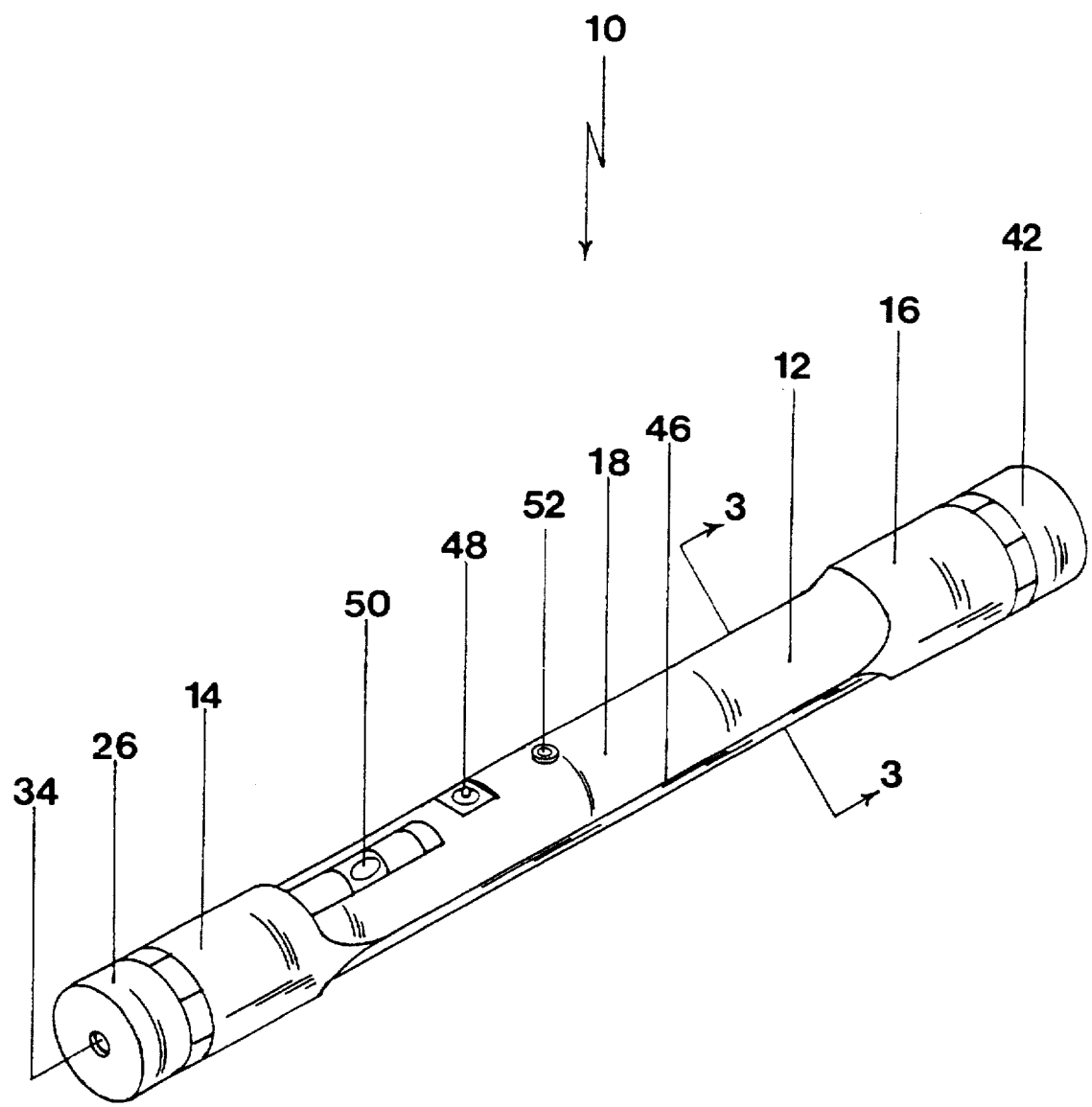
FIG. 1 is a perspective view of the hand-held laser level grade checking device.
Figure 2:
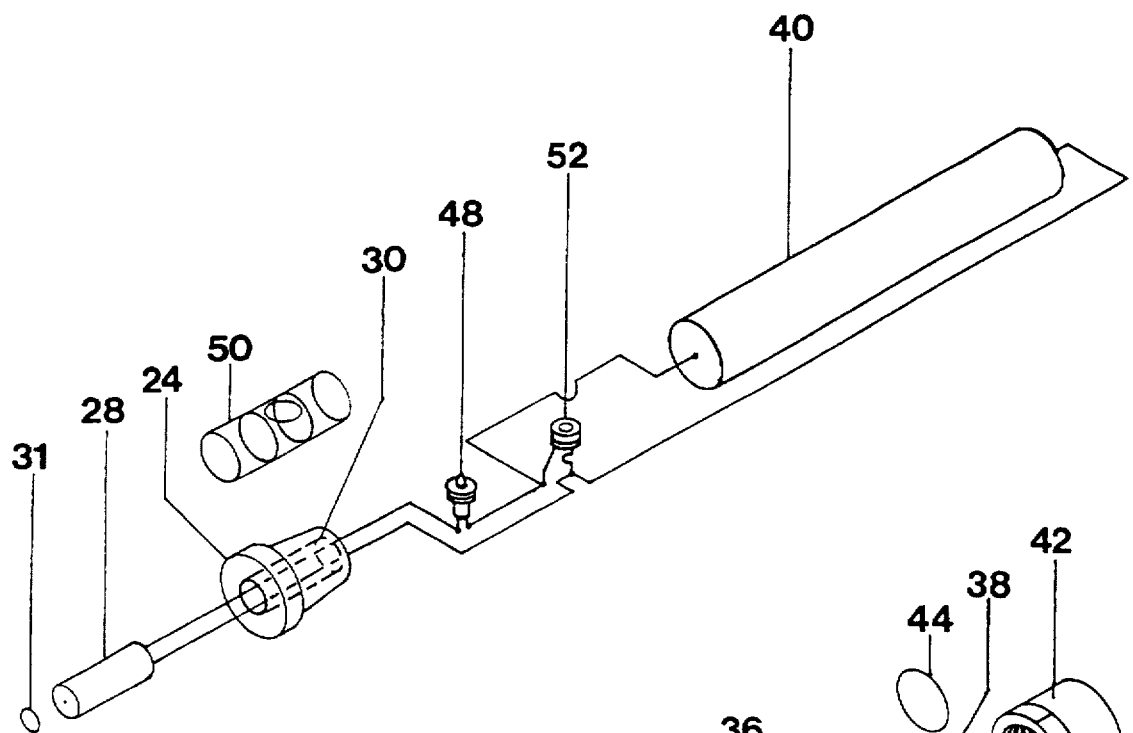
FIG. 2 is an exploded perspective view showing the structural components and electrical connections of the hand-held laser level grade checking device.
Figure 2A:
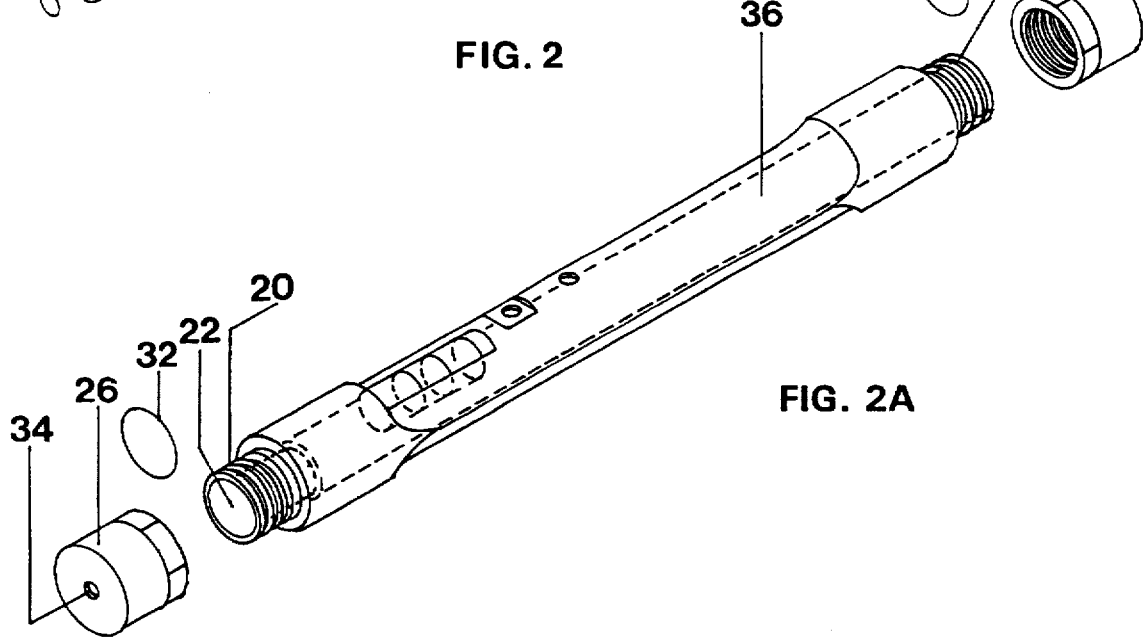

The preferred embodiment of the hand-held laser level grade checking device, designated generally 10, is illustrated in FIGS. 1 through 4. The grade checking device 10 includes an elongated housing 12 having a forward end 14, a rearward end 16 and an external surface 18. The forward end 14 of the grade checking device 10 further comprises a first threaded end 20 and a modular plug compartment 22. In the preferred embodiment, the modular plug compartment 22 is in an open configuration; however, as is known in the art, alternative configurations such as closable compartments can accomplish the same objectives as set forth herein. A modular plug 24, sized to fit tightly in the modular plug compartment 22 to prevent any movement of the modular plug 24, is removably placed in the modular plug compartment 22. A forward end cap 26, threadably received by the first threaded end 20, encloses the modular plug compartment 22 and holds the modular plug 24 fixedly in place.

A daylight visible wavelength semiconductor laser diode 28, with the appropriate drive circuit attached, is removably held in the diode compartment 30 of the modular plug 24. The diode compartment 30 is sized to tightly hold laser diode 28. As is known in the art, visible light laser diodes 28 typically emit light beams having a wavelength in the 600 to 680 nanometer range. Light beams in this range can be powered by a low voltage power supply, allow the beam to be seen in daylight and provide a beam that can be collimated such that it remains pinpoint up to 2,400 feet or more from its source. A collimating lens 31, located forward of the laser diode 28, collimates the light beam from laser diode 28 so that the light beam remains pinpoint at distances typically found at most construction sites. The ideal laser diode 28 will be durable enough to withstand the rigors of the construction industry, provide a visible light wavelength that can be seen over long distances, be powered by low voltage battery cells and have a relatively long operating life. In place of individual laser diode 28 and collimating lens 31 components, the device is suitable for utilizing commercially available laser diode modules, such as model number VLM-635-OSL from Quarton U.S.A., Ltd. Co. This laser diode module utilizes a five milliwatt laser that emits a light beam having a wavelength of 635 nanometers by utilizing an aluminum gallium arsenide element. Other suitable laser diodes are also available.

The forward end cap 26, threadably received by first threaded end 20, further comprises a first sealing member 32 and a clear lens 34. The sealing member 32 facilitates enclosing the modular plug 24 and prevents moisture or dirt from entering the modular plug compartment 22. The clear lens 34 permits the laser beam to pass through the forward end cap 26 while also preventing dirt or other debris from entering the diode compartment 30.

The rearward end 16 of the laser level grade checking device 10 further comprises a battery compartment 36 and a second threaded end 38. One or more battery cells 40 fit within the battery compartment 36. Once placed within the battery compartment 36, the battery cell 40 is in electrical communication with and powers the laser diode 28. A rearward end cap 42, threadably received by the second threaded end 38, has a second sealing member 44 to facilitate enclosing the battery cell 40 and to prevent moisture and dirt from entering the battery compartment 36.

Figure 3:
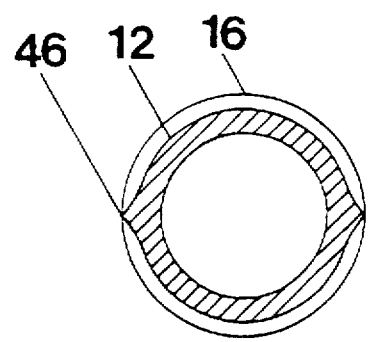
FIG. 3 is a sectional view along line 3—3 of FIG. 1 showing the centered ridge on the external surface of the device.
Figure 4:
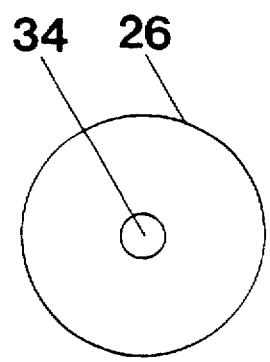
FIG. 4 is a front view of the device showing the front end cap and clear lens.

In the preferred embodiment, the external surface 18 of the housing 12 further comprises an elongated ridge 46, formed by the elongated oval shape of the housing 12, as best shown in FIG. 3, that is in axial alignment with the collimated beam of light emitted from the laser diode 28 (after passing through the collimating lens 31). If the shape of the housing is round, the elongated ridge 46 can be a raised portion of the housing 12. For ease of use, the preferred embodiment utilizes a tapered modular plug compartment 22 and a modular plug 24 that is tapered in conformity with the modular plug compartment 22 such that the laser diode 28 is placed in axial alignment with the housing 12 when positioned within the modular plug compartment 22. In this configuration, with the elongated ridge 46 also in axial alignment with the housing 12, the placement of the laser diode 28 and modular plug 24 within the modular plug compartment 22 results in the elongated ridge 46 being in axial alignment with the collimated beam of light that is emitted from the laser diode 28.

Located on the external surface 18 of the housing 12 is a switching device, such as a momentary switch 48, operatively connecting the laser diode 28 and the battery cell 40. Also located on the external surface 18 of the housing 12 is a level indicator device, such as a bubble level 50, for ensuring that the housing 12 and, therefore the collimated beam of light, is horizontal to the surface of the ground.

In use, the gradechecker places the elongated ridge 46 on the external surface 18 of the laser level grade checking device 10 against an engineer's sticktape or other measuring equipment and aims the device 10 at a guard lath located at the construction site. By holding the device 10 level, as indicated by the bubble level 50, activating the momentary switch 48 to produce a beam of visible light from the laser diode 28 and moving the device 10 up or down the measuring equipment, the gradechecker can check the level of the grade where he or she is standing. After extended use, the battery cell 40 and the laser diode 28 will need to be replaced. The battery cell 40, located in the battery compartment 36, is replaced by removing the rearward end cap 42 from the housing 12, removing the old battery cell 40 and replacing it with a new battery cell 40 and replacing the rearward end cap 42 on the rearward end of the housing 16. In the preferred embodiment, the laser diode 28 is part of a laser diode module and is replaced by removing the forward end cap 26, pulling the laser module plug 24 out of the module plug compartment 22 and then replacing the laser diode module in the laser diode compartment 30 with an equivalent new product. The modular plug 24 with the new laser diode 28 is placed back into the modular plug compartment 22 and the forward end cap 26 is replaced back on the forward end 14 of the housing 12.

Alternative embodiments of the device 10 includes the use of a rechargeable battery cell 40 and a recharge port 52 operatively connected to the battery cell compartment 36 so that the user can plug a recharger unit into the recharge port 52 of the device 10 when not in use or to facilitate connection to an external power supply, such as a battery pack or other source of direct current power.

While there is shown and described herein certain specific alternative forms of the invention, it will be readily apparent to those skilled in the art that the invention is not so limited, but is susceptible to various modifications and rearrangements in design and materials without departing from the spirit and scope of the invention.

What is claimed is:

1. A hand-held laser level grade checking device, comprising:
    a generally cylindrical housing having a generally cylindrical forward end, a generally cylindrical rearward end and a generally oval central section forming a pair of ridges on opposite sides of the external surface of said housing;
    laser diode means for emitting a visible laser beam;
    positioning means positioning said laser diode means within said housing;
    power means electrically connected to said laser diode means for powering said laser diode means; and
    optical means located forward of said laser diode means for receiving said visible laser beam and delivering a collimated light beam of low divergence out of said housing;
    wherein said ridges form alignment means in parallel relationship with said collimated light beam for aligning said collimated light beam with a measurement mark on an external measurement device.

2. The grade checking device according to claim 1, wherein said housing is elongated.

3. The grade checking device according to claim 1, wherein said device further comprises level indicator means on said external surface of said housing for holding said collimated light beam parallel to the surface of the ground.

4. The grade checking device according to claim 3, wherein said level indicator means is a bubble level.

5. The grade checking device according to claim 1, wherein said positioning means and said alignment means are in axial alignment with said housing.

6. The grade checking device according to claim 1, wherein said positioning means comprises a modular plug compartment in said forward end of said housing and a modular plug removably received by said modular plug compartment, wherein said laser diode means is mounted within said modular plug.

7. The grade checking device according to claim 6, wherein said positioning means further comprises a forward end cap removably attached to said forward end of said housing enclosing said modular plug and said laser diode means into said modular plug compartment.

8. The grade checking device according to claim 7, wherein said forward end cap is threadably received by said forward end of said housing.

9. The grade checking device according to claim 7, wherein said device further comprises a first sealing member interposed between said forward end cap and said forward end of said housing.

10. The grade checking device according to claim 1, wherein said laser diode means and said optical means comprise a laser diode module and said positioning means positions said laser diode module within said housing.

11. The grade checking device according to claim 1, wherein said device further comprises a battery compartment located in said housing and said power means is one or more battery cells located within said battery compartment.

12. The grade checking device according to claim 11, wherein said device further comprises a rearward end cap removably attached to said rearward end of said housing and a sealing member interposed between said rearward end cap and said rearward end of said housing, wherein said rearward end cap encloses said one or more battery cells within said battery compartment.

13. The grade checking device according to claim 11, wherein said one or more battery cells are rechargeable and said device further comprises recharge means on said housing operatively connected to said battery compartment for recharging said one or more battery cells.

14. The grade checking device according to claim 1, wherein said device further comprises a switching means operatively connected to said power means for intermittently operating said laser diode means.

15. The grade checking device according to claim 14, wherein said switching means comprises a momentary switch.

16. A hand-held laser level grade checking device to be used in conjunction with a measuring device having measurement marks thereon, comprising:
    an elongated housing having a generally cylindrical forward end, a generally cylindrical rearward end and an external surface, said forward end further comprising a modular plug compartment;
    laser diode means for emitting a visible laser beam, said laser diode means being mounted within a modular plug removably received by said modular plug compartment;
    optical means forward of said laser diode means for receiving said visible laser beam and delivering a collimated light beam of low divergence out of said housing;
    a forward end cap removably attached to said forward end of said housing, enclosing said laser diode means and said modular plug into said modular plug compartment;
    power means electrically connected to said laser diode means for powering said laser diode means;
    at least one ridge on the external surface of said housing formed by a generally oval central section thereof, said central section located between and connecting said forward end to said rearward end, said ridge defining an alignment means in parallel relationship with said collimated light beam for axially aligning said collimated light beam with a measurement mark on the measuring device; and
    level indicator means on said external surface of said housing for placing said collimated light beam parallel to the surface of the ground.

17. A hand-held laser level grade checking device to be used in conjunction with a measuring device having measurement marks thereon, comprising:
    an elongated housing having a generally cylindrical forward end, a generally cylindrical rearward end and an external surface, said forward end further comprising a modular plug compartment;
    a modular plug removably received by said modular plug compartment;
    laser diode means mounted within said modular plug for emitting a visible laser beam, wherein said visible laser beam is axially aligned with said elongated housing;
    optical means forward of said laser diode means for receiving said visible laser beam and delivering a collimated light beam of low divergence out of said housing;

a forward end cap removably attached to said forward end of said housing removably enclosing said laser diode means and said modular plug into said modular plug compartment;

a first sealing member interposed between said forward end cap and said forward end of said housing;

a battery compartment within said rearward end of said housing to contain one or more battery cells in electrical connection with said laser diode means;

a rearward end cap removably attached to said rearward end of said housing enclosing said one or more battery cells within said battery compartment;

a second sealing member interposed between said rearward end cap and said rearward end of said housing;

level indicator means on said external surface of said housing for placing said collimated light beam parallel to the surface of the ground;

at least one ridge on the external surface of said housing formed by a generally oval central section thereof, said central section located between and connecting said forward end to said rearward end, said ridge defining an alignment means in parallel relationship with said housing for axially aligning said collimated light beam with a measurement mark on the measuring device; and switching means operatively connected to said one or more battery cells for operating said laser diode means.

* * * * *